UNITED STATES PATENT OFFICE.

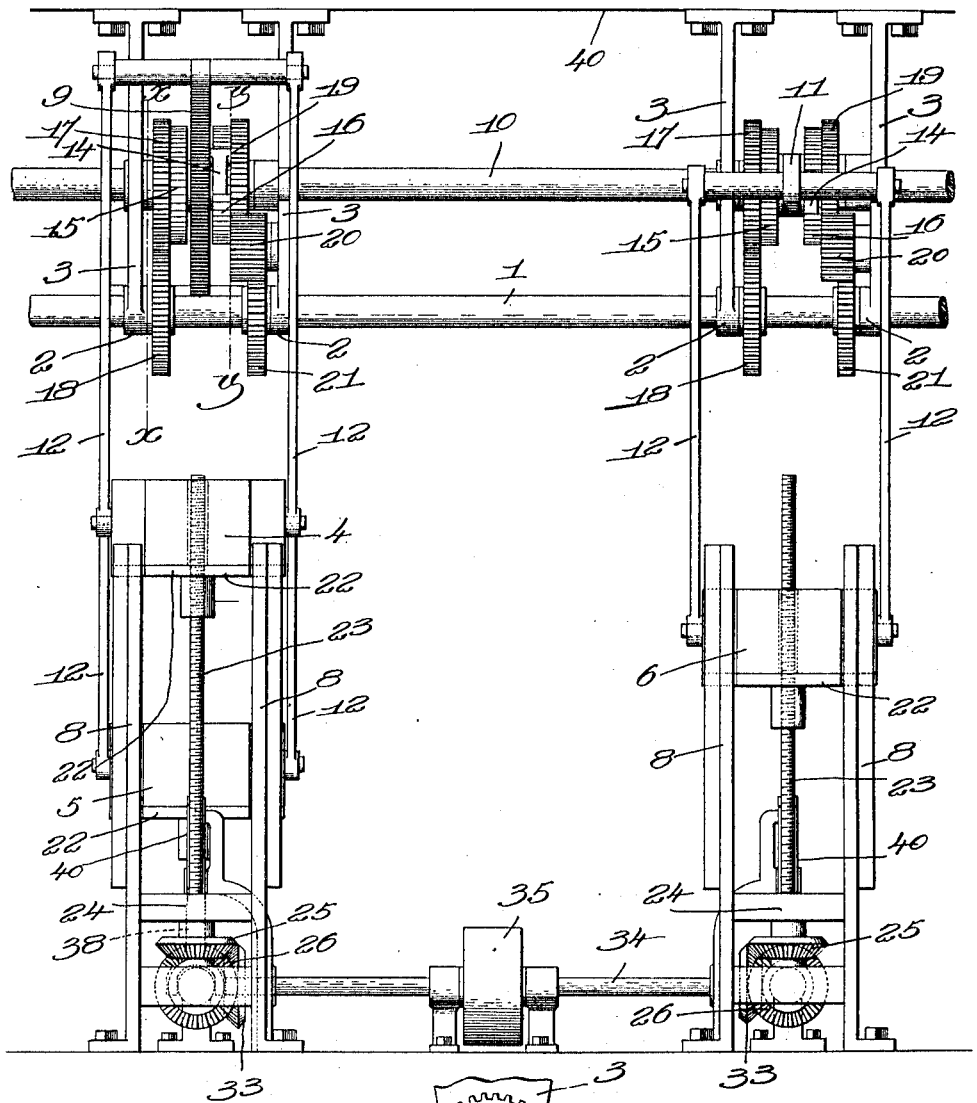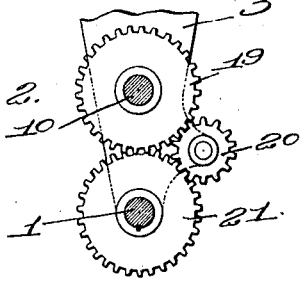

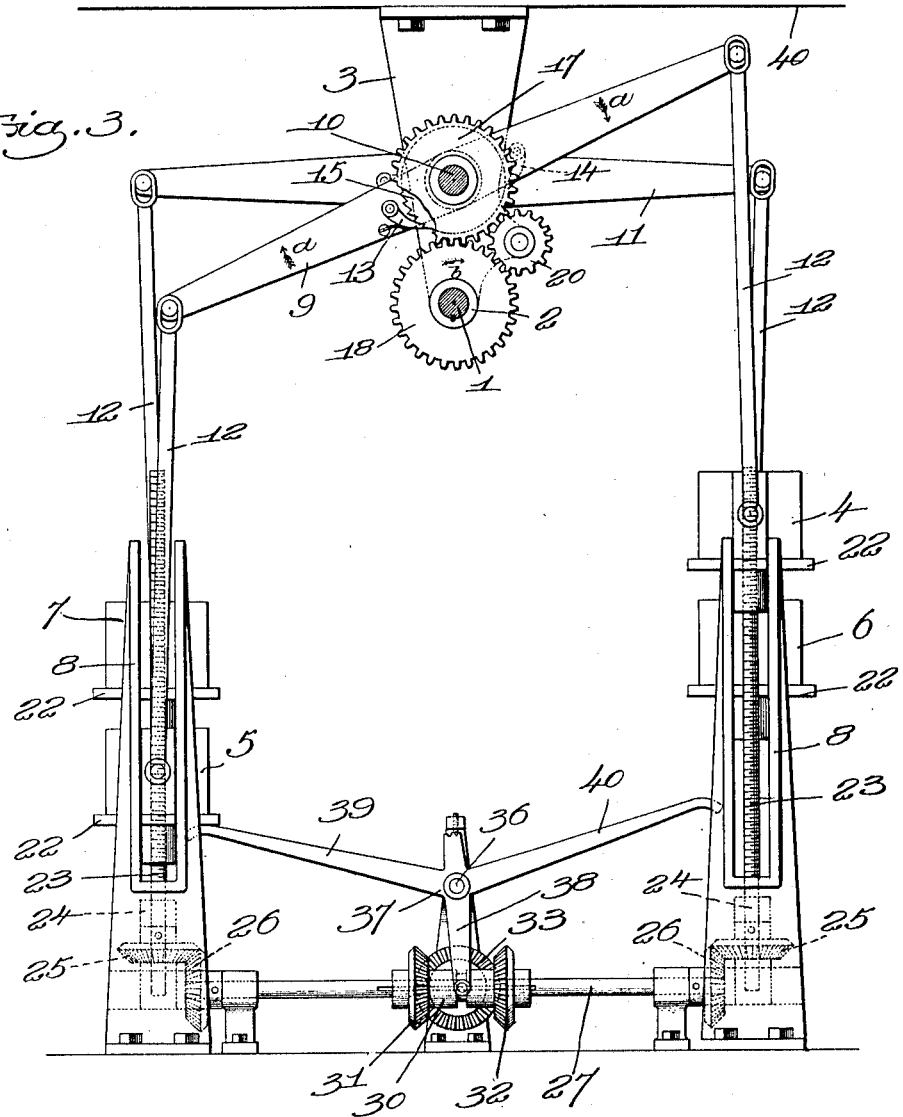

JOSEPH LOVELY, OF HAMILTON, RHODE ISLAND.

POWER-TRANSMISSION DEVICE.

1,022,099.      Specification of Letters Patent.      Patented Apr. 2, 1912.

Application filed August 3, 1911. Serial No. 642,154.

*To all whom it may concern:*

Be it known that I, JOSEPH LOVELY, a citizen of the United States, residing at Hamilton, county of Washington, State of Rhode Island, have invented an Improvement in Power-Transmission Devices, of which the following description, in connection with the accompanying drawing, is a specification, like characters on the drawing representing like parts.

This invention relates to power-transmission devices of that type in which the power is developed by the operation of a falling weight, and the object of the invention is to provide a novel mechanism of this type which is comparatively simple in its construction and which can be used for a variety of purposes.

Referring to the drawings wherein I have illustrated one embodiment of my invention, Figure 1 is a side view of the device; Fig. 2 is a section on the line $y$—$y$, Fig. 1; Fig. 3 is a side view with the upper part thereof shown in section on substantially the line $x$—$x$, Fig. 1.

1 designates a shaft which I will hereinafter refer to as the power shaft, it being the shaft which is operated by my mechanism and from which the power is taken. This shaft 1 is supported in any suitable bearings 2, those herein shown being formed in brackets 3 which are secured to a suitable overhead support 40. This shaft 1 derives its motion from the rising and falling weights 4, 5, 6, 7 which are adapted to move up and down in suitable guides 8 that are supported in any appropriate way. Said weights are arranged in pairs, the weights 4 and 5 constituting one pair and the weights 6 and 7 constituting another pair. The weights 4 and 5 of one pair are hung from opposite ends of a lever 9 which is mounted to turn on a rod or shaft 10 that extends parallel to the power shaft 1 and is supported in the brackets 3, and the weights 6 and 7 are hung from the opposite ends of another lever 11 also pivotally mounted on the shaft 10. As herein shown each weight has connected thereto a link 12 by which it is hung from its lever, although any suitable connection between the weights and the levers might be employed. Provision is made whereby the rocking of the levers 9 and 11 about the shaft 10 will give continued forward rotary movement to the shaft 1. In the present embodiment of my invention, this is accomplished by the following mechanism: Each of the levers 9 and 11 has pivotally connected thereto two oppositely-disposed pawls 13 and 14 which coöperate with ratchet wheels 15 and 16, respectively, that are loosely mounted on the shaft 10. The ratchet wheel 15 has rigid therewith a gear 17 which meshes with a gear 18 fast on the shaft 1. The ratchet 16 has rigid therewith a gear 19 which meshes with an idler 20 supported by the bracket 3 and which in turn meshes with a gear 21 fast on the shaft 1. When the lever 9 is moving in the direction of the arrows $a$ thereon the pawl 14 will coöperate with the ratchet wheel 16 and gears 19, 20 and 21, thereby to turn the shaft 1 in the direction of the arrow $b$, Fig. 3, and during this time the pawl 13 will click over the teeth of the ratchet 15. When the lever 9 swings in the opposite direction the pawl 14 is idle, but the pawl 13 coöperates with the ratchet 15 and gears 17 and 18 to continue the rotation of the shaft 1 in the direction of the arrow $b$. A similar pawl and ratchet and gear mechanism connects the lever 11 with the shaft 1. As a result the oscillating movement of the levers 9 and 11 will give continued forward rotary movement to the shaft 1.

The oscillatory movement is given to the levers 9 and 11 by the operation of the weights 4, 5, 6 and 7, and to accomplish this I provide means for lifting one weight of each pair thereby to allow the other weight of said pair to act by gravity on the lever to which it is connected and turn said lever, said means being so constructed that it will come into play to raise any weight as soon as said weight has reached the lower limit of its movement. In the embodiment of the invention herein shown each weight is supported on a holder 22 which has screw-threaded connection with a vertically-extending screw 23 that is supported in any suitable bearings 24. Each screw has at its lower end a bevel gear 25 and the two bevel gears of either pair of screws mesh with bevel gears 26 on a shaft 27 which extends from one screw to the other, the gearing being so arranged that when the shaft 27 rotates one screw will be turned to elevate one platform or support 22 while the other screw will be turned to lower the other platform or support.

Means are provided for reversing the direction of rotation of the shaft 27 when any weight reaches the lower limit of its movement, and while any suitable means for this purpose may be employed I have herein shown a reversing gear which is operated by each weight as it descends. Each shaft 27 has slidably mounted thereon but splined thereto a sleeve 30 having rigid therewith two oppositely-disposed bevel gears 31, 32. These gears are adapted to mesh with a gear 33 on a driving shaft 34 which is provided with a pulley 35 by which power may be applied thereto. The sleeve 30 is adapted to be moved longitudinally of the shaft 27 to bring either of the gears 31 or 32 into mesh with the gear 33 by a reversing member which is actuated by the falling weights. This reversing member is shown as a three-armed member 37 pivotally mounted at 36 to a suitable stand and having one arm 38 in the form of a fork which embraces the sleeve 30 and operates in a groove therein and having two other arms 39, 40 extending into position to be engaged by the supports 22 of the weights 4 and 5 as they descend.

With the construction thus described it will be apparent that when the shaft 34 is rotated it will operate to elevate one weight of each pair and at the same time it will lower the platform or support 22 for the other weight of each pair. The lowering of the platforms or supports 22 allows the weights thereon to descend and the descending weights act on the levers 9, and 11 to give them a turning movement, it being readily understood that the rising platforms serve to support the weights connected to the opposite ends of the levers and take said weights off from the levers. When any weight reaches the lower limit of its movement the platform thereof engages one arm of the reversing lever 37 thereby to operate the reversing mechanism and to cause the shaft 27 to rotate in the opposite direction. The result of this will be that the lowered weight will be lifted by the reverse operation of its screw while the elevated weight will be allowed to descend and thus turn the lever in the opposite direction.

I propose to arrange the weights and levers so that when one lever is at the extreme limit of its movement the other lever will be at approximately midway of its stroke. The reason for this is that one pair of weights is in operation to keep the parts moving while the reversing mechanism for the other pair of weights is operating.

By making the levers 9 and 11 of considerable length comparatively light weights will apply a considerable turning force to the power shaft, although I wish it understood that the size of the weights used and the length of the levers may be varied without departing from the invention. It will be obvious, of course, that the shaft 1 will rotate at a very much slower rate of speed than the shaft 34 and that the device constitutes one form of reducing gearing.

Having fully described my invention, what I claim as new and desire to secure by Letters Patent is:—

1. In a power transmission device, the combination with a rocking lever, of a weight connected at each end thereof, means to raise the weights alternately, a power shaft, and means to rotate the shaft continuously in one direction by the oscillating movement of the lever.

2. In a power generator, the combination with a rocking lever, of a weight connected to each end thereof, a support for each weight, a screw for raising and lowering each support alternately, a power shaft, and means to rotate the shaft continuously in one direction by the oscillating movement of the lever.

3. In a power transmission device, the combination with a rocking lever, of a weight connected to each end thereof, a support for each weight, a screw for raising and lowering each weight, screw-operating mechanism, a power shaft, means to rotate the shaft continuously in one direction by oscillating movement of the lever, and means controlled by the weight for reversing the screw-operating mechanism.

4. In a power transmission device, the combination with a rocking lever, of a weight connected to each end thereof, a support for each weight, a screw for raising and lowering each weight, screw-operating mechanism, a power shaft, means to rotate the shaft continuously in one direction by oscillating movement of the lever, and means controlled by each weight when it reaches the lower limit of its movement to reverse the screw-operating mechanism.

In testimony whereof, I have signed my name to this specification in the presence of two subscribing witnesses.

JOSEPH LOVELY.

Witnesses:
GEORGE STONE,
MARIA STONE.

---

Copies of this patent may be obtained for five cents each, by addressing the "Commissioner of Patents, Washington, D. C."